(12) United States Patent
Cook

(10) Patent No.: US 6,993,706 B2
(45) Date of Patent: Jan. 31, 2006

(54) METHOD, APPARATUS, AND PROGRAM FOR A STATE MACHINE FRAMEWORK

(75) Inventor: John A. Cook, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 10/047,801

(22) Filed: Jan. 15, 2002

(65) Prior Publication Data

US 2003/0135533 A1 Jul. 17, 2003

(51) Int. Cl.
*G06F 9/445* (2006.01)
(52) U.S. Cl. .................... 715/315; 717/100; 717/113
(58) Field of Classification Search ............... 719/315, 719/316; 717/100, 113
See application file for complete search history.

(56) References Cited

U.S. PATENT DOCUMENTS

| | | | |
|---|---|---|---|
| 5,469,553 A | | 11/1995 | Patrick |
| 5,517,432 A | * | 5/1996 | Chandra et al. .............. 703/14 |
| 5,717,692 A | | 2/1998 | Blackwell |
| 5,801,687 A | * | 9/1998 | Peterson et al. ......... 715/500.1 |
| 5,995,753 A | * | 11/1999 | Walker ....................... 717/108 |
| 6,138,171 A | * | 10/2000 | Walker ....................... 719/318 |
| 6,157,648 A | | 12/2000 | Voit et al. .................... 370/401 |
| 6,463,565 B1 | * | 10/2002 | Kelly et al. ..................... 716/1 |
| 6,477,439 B1 | * | 11/2002 | Bernaden et al. .......... 700/103 |
| 6,751,753 B2 | * | 6/2004 | Nguyen et al. ............... 714/39 |
| 6,839,340 B1 | | 1/2005 | Voit et al. .................... 370/352 |
| 2002/0032692 A1 | | 3/2002 | Suzuki et al. |
| 2002/0144015 A1 | * | 10/2002 | Lortz .......................... 709/318 |
| 2003/0159138 A1 | | 8/2003 | Curtis ......................... 717/175 |

OTHER PUBLICATIONS

Ferreira, Luciane Lamour et al. "The Reflective State Pattern." 1998.*
Van Gurp, Jilles et al. "On the Implementation of Finite State Machines." Proceedings of the IASTED International Conference. Oct. 6-8, 1999.*
Liu, Chung-Shyan et al. "An FSM-Based Program Generator for Communication Protocol Software." IEEE. 1994.*
Samek, Miro et al. "State-Oriented Programming." Embedded Systems Programming. Aug. 2000.*
Gao, jerry Zeyu et al. "An Object State Test Model: Object State Diagram." IBM Centre for Advance Studies Conference. 1995.*
Venners, Bill. "Designing Object Initialization, Ensure Proper Initialization of Your Objects at All Times." JavaWorld, Feb. 1998.*
Chung-Shyan et al., "An FSM-Based Program Generator for Communication Protocol Software", IEEE, Nov., 1994, pp. 181-187.

(Continued)

*Primary Examiner*—Lewis A. Bullock, Jr.
(74) *Attorney, Agent, or Firm*—Duke W. Yee; Jeffrey S. LaBaw; Stephen R. Tkacs

(57) ABSTRACT

A programming framework is provided for designing and implementing software state machines. A state machine initializer may be created that defines the states, conditions, actions, triggers, and state transitions for the software state machines. A set of user interfaces, such as graphical user interfaces, may also be provided for creating initializers. An abstract state machine object may then be created that creates an instance of a particular state machine initializer. The state machine initializer acts as a helper to the state machine object, which uses the initializer to create an array of state transition objects. Once the state machine objects creates the array of state transition objects, the state machine is ready to run. A set of programming interfaces may also be provided to define the programming framework.

9 Claims, 8 Drawing Sheets

OTHER PUBLICATIONS

Thomas et al., "State Machines", IEEE, vol. 19, Issue 6, Nov.-Dec. 2002, pp. 10-12.

Burhart et al., "Software Reuse and Portability of Parallel Programs", IEEE, vol. 2, Jan., 1995, pp. 289-298.

* cited by examiner

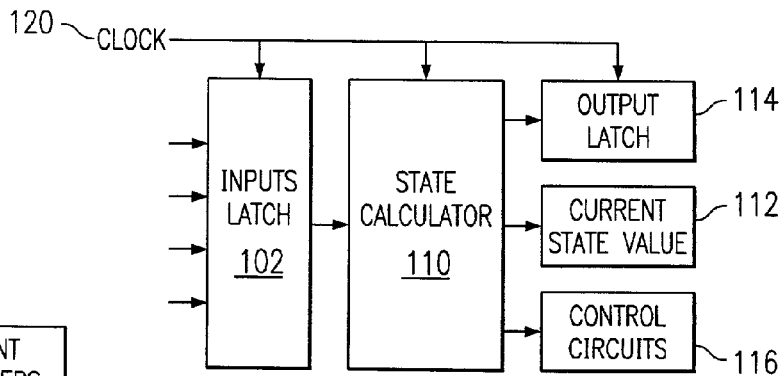
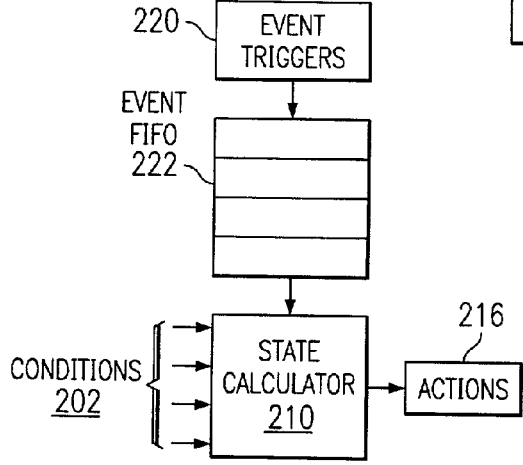
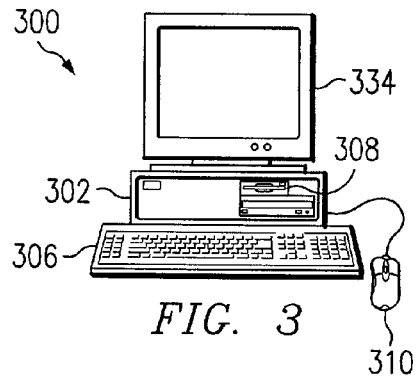
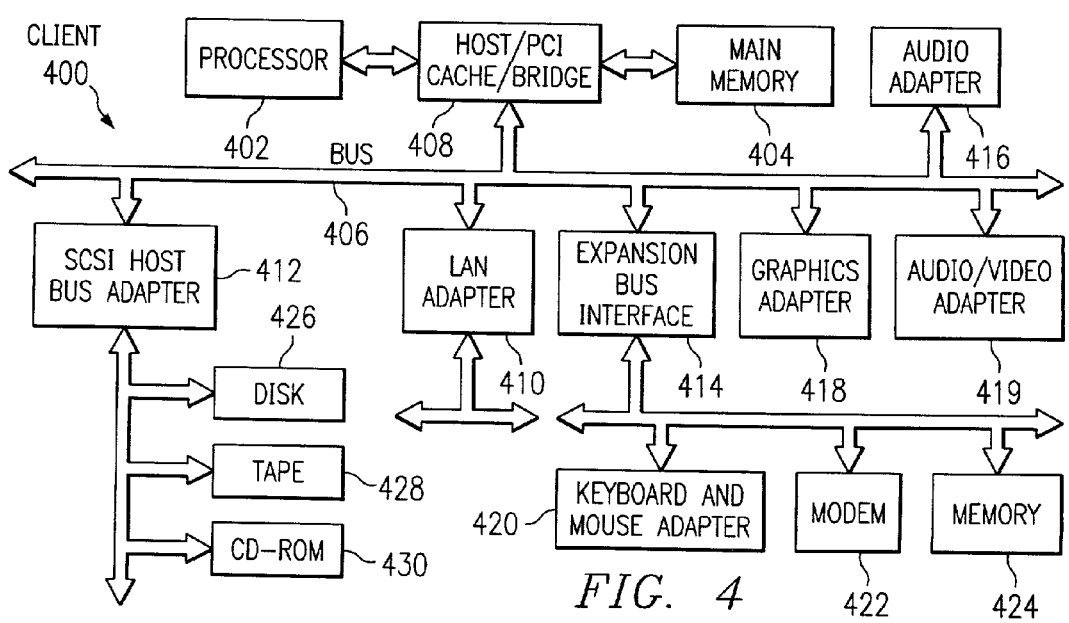

| STATES | |
|---|---|
| ID | DESCRIPTION |
| S1 | NEW |
| S2 | STARTING |
| S3 | RUNNING |
| S4 | PAUSED |
| S5 | STOPPING |
| S6 | STOPPED |
| S7 | ERROR |

510

| ACTIONS | |
|---|---|
| ID | DESCRIPTION |
| A1 | START EMBEDDED TASK |
| A2 | STOP EMBEDDED TASK |
| A3 | PAUSE TRACE SUBSYSTEM |
| A4 | RESUME TRACE SUBSYSTEM |

520

| INPUTS | |
|---|---|
| ID | DESCRIPTION |
| TSV | EMBEDDED TASK STATE VARIABLE {"NEW","STARTING","RUNNING","STOPPING","STOPPED","ERROR"} |
| CSV | EMBEDDED COMMAND STATE VARIABLE {"NO-OP","START","STOP","PAUSE","RESUME"} |

530

| CONDITIONS | | |
|---|---|---|
| ID | CSV VALUE | TSV VALUE |
| C1 | NO-OP | NEW |
| C2 | START | NEW OR STARTING |
| C3 | START | RUNNING |
| C4 | STOP | NEW |
| C5 | -- | ERROR |
| C6 | STOP | STARTING OR RUNNING |
| C7 | -- | STOPPED |
| C8 | RESUME | RUNNING |
| C9 | STOP | RUNNING |
| C10 | PAUSE | RUNNING |
| C11 | -- | STOPPING |

560

| EVENTS | |
|---|---|
| ID | DESCRIPTION |
| E1 | STATE CHANGED EVENT |

540

| TRIGGERS | |
|---|---|
| ID | DESCRIPTION |
| T1 | STATE CHANGED EVENT |
| T2 | NEW COMMAND WRITTEN |

| STATE TABLE ||||||||
|---|---|---|---|---|---|---|---|
| CURRENT STATE/NEXT STATE | S1 | S2 | S3 | S4 | S5 | S6 | S7 |
| S1 | C1<br>--<br>-- | C2<br>A1<br>E1 | C3<br>--<br>E1 | X | X | C4<br>--<br>E1 | C5<br>--<br>E1 |
| S2 | X | C2<br>--<br>-- | C3<br>A4<br>E1 | X | C6<br>A2, A3<br>E1 | C7<br>--<br>E1 | C5<br>--<br>E1 |
| S3 | X | X | C3 C8<br>-- --<br>-- -- | C10<br>A3<br>E1 | C9<br>A2, A3<br>E1 | C7<br>A3<br>E1 | C5<br>A3<br>E1 |
| S4 | X | X | C8<br>A4<br>E1 | C10<br>--<br>-- | C9<br>A2, A3<br>E1 | C7<br>A3<br>E1 | C5<br>A3<br>E1 |
| S5 | X | X | X | X | C11<br>--<br>-- | C7<br>--<br>E1 | C5<br>--<br>E1 |
| S6 | X | X | X | X | X | C7<br>--<br>-- | X |
| S7 | X | X | X | X | X | X | C5<br>--<br>-- |

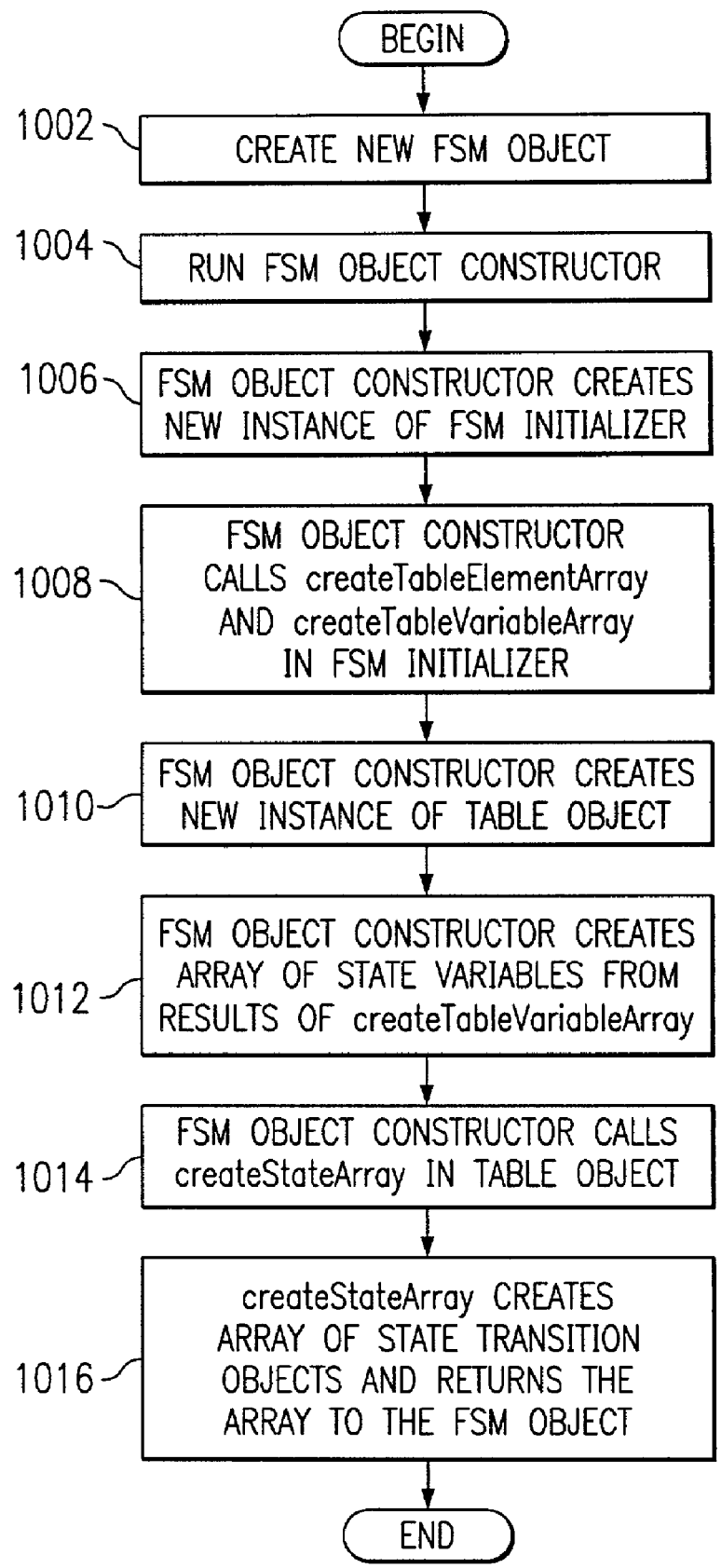

METHOD, APPARATUS, AND PROGRAM FOR A STATE MACHINE FRAMEWORK

BACKGROUND OF THE INVENTION

1. Technical Field

The present invention relates to data processing and, in particular, to software state machines. Still more particularly, the present invention provides a method, apparatus, and program for a programming framework for creating, using, and re-using software state machines.

2. Description of Related Art

State machines, also referred to as "finite state machines," are computing devices designed with the operational states required to solve a specific problem. The circuits are minimized and specialized for the application. There are countless special-purpose devices built as state machines.

A hardware state machine typically receives one or more inputs, determines from those inputs whether the current state changes, and takes an action when a state transition occurs. For example, an elevator may be in a state of "stopped" and recognize that a floor button is pressed. In response, the elevator state machine may then transition to a "moving" state.

With reference to FIG. 1, a block diagram of a typical hardware state machine is shown. The hardware state machine receives inputs through inputs latch 102. The state calculator 110 determines the current state based on the inputs. The state machine may provide the current state 112. The state machine may also provide outputs through output latch 114 or take an action through control circuits 116. Therefore, in the above example, if the elevator state machine transitions from "stopped" to "moving," the state machine may activate a control circuit to close the elevator doors.

State transitions in a hardware state machine are typically synchronized with a clock, such as clock 120 in FIG. 1. The state calculator may simply look up the current state and the inputs in a table. Thus, state calculator 110 may simply be a lookup table in a memory.

Software may also operate as a state machine. For example, a software media player may be in a "stopped," "paused," or "playing" state. The software media player, in this example, may monitor graphical buttons on a media player interface and change state in response to activation of those buttons.

With reference now to FIG. 2, a block diagram of a typical software state machine is shown. The software equivalent of latching inputs is to collect them by a means such as reading them into input variables. The software inputs are shown as conditions 202. The state calculator 210 determines whether to make a state change based on the current state and the conditions. The state calculator may comprise a sequence of conditional statements, such as "if-then" statements, or it may use other means such as a switch statement or a dispatching table.

The software equivalent of control circuits is the invocation of actions 216, which may be software instructions, programs, methods, etc. The software equivalent of synchronizing to a clock may be to monitor events that have been collected into an event FIFO (first-in, first-out). Thus, a software state machine may include event triggers 220 that "listen to" events and record them into FIFO 222. Typically, the event triggers simply monitor for a change in conditions 202.

The design of software state machines may be simple for some applications. The designer may simply create a table of states, actions and conditions. The programmer must then create software instructions for each potential state transition. This is no easy task, particularly for more complicated applications. Also, once a software state machine is created, it may be difficult to make changes. For example, if there is an error in one of the state transitions, it would be very difficult to locate and modify the instructions that pertain to that particular state transition in the code.

Furthermore, once software state machines are created, it is difficult for one software state machine to interact with another software state machine. Each state machine may be programmed in a different language using different conventions. Thus, it may be impossible, or at least very difficult, to receive the state of a software state machine once it is coded. It is important to be able to reuse state machines in the designs of new state machines. Unless the design of the state machine provides a means that the outputs of one state machine can be used as the inputs to other state machines, and unless that means follows good component-oriented and object-oriented principles, combining the state machines can be very difficult.

Therefore, it would be advantageous to provide an improved programming framework for creating and using software state machines.

SUMMARY OF THE INVENTION

The present invention provides a programming framework for designing and implementing software state machines. When designing state machines, a state machine initializer may be created that defines the states, conditions, actions, triggers, and state transitions for the software state machines. A set of user interfaces, such as graphical user interfaces, may also be provided for creating initializers.

An abstract state machine object may then be created that creates an instance of a state machine which loads its design information from a particular state machine initializer. The state machine initializer acts as a helper to the state machine object, which uses the initializer to create an array of state transition objects. Once the state machine objects creates the array of state transition objects, the state machine is ready to run. A set of programming interfaces may also be provided to define the programming framework.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of a typical hardware state machine;

FIG. 2 is a block diagram of a typical software state machine;

FIG. 3 is a pictorial representation of a data processing system in which the present invention may be implemented in accordance with a preferred embodiment of the present invention;

FIG. 4 is a block diagram of a data processing system in which the present invention may be implemented;

FIGS. 5A–5C illustrate an example trace task state machine in accordance with a preferred embodiment of the present invention;

FIG. 10 is a flowchart illustrating the building of a state machine at runtime in accordance with a preferred embodiment of the present invention.

DETAILED DESCRIPTION OF THE PREFERRED EMBODIMENT

Figure 5C:
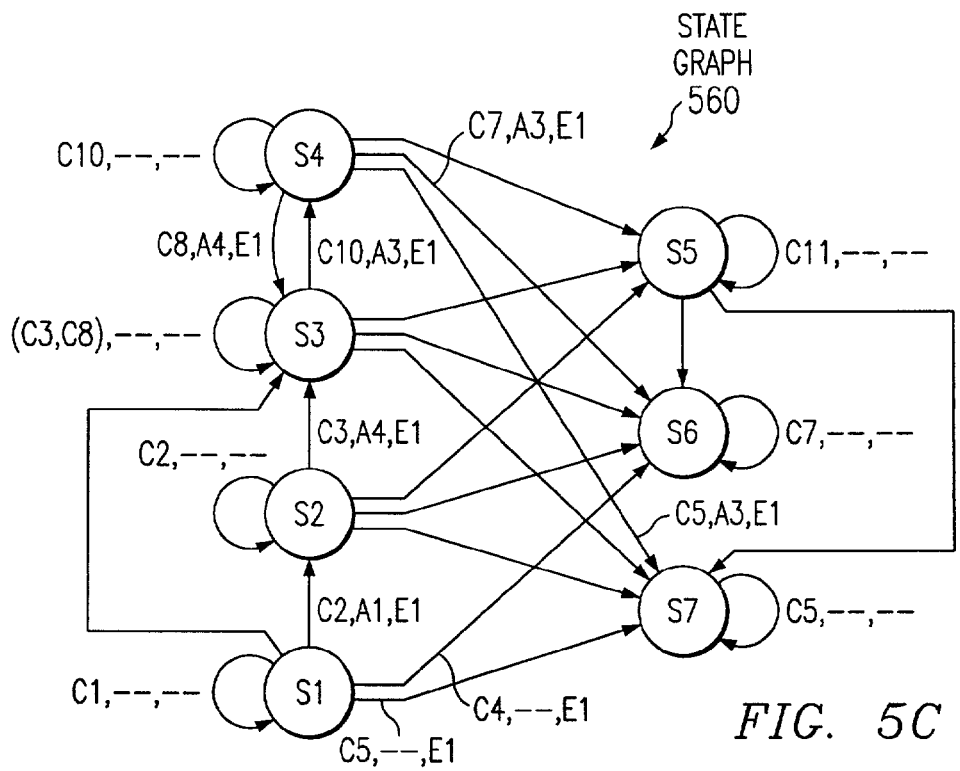

With reference now to the figures and in particular with reference to FIG. 3, a pictorial representation of a data processing system in which the present invention may be implemented is depicted in accordance with a preferred embodiment of the present invention. A computer 300 is depicted which includes system unit 302, video display terminal 304, keyboard 306, storage devices 308, which may include floppy drives and other types of permanent and removable storage media, and mouse 310. Additional input devices may be included with personal computer 300, such as, for example, a joystick, touchpad, touch screen, trackball, microphone, and the like. Computer 300 can be implemented using any suitable computer, such as an IBM RS/6000 computer or IntelliStation computer, which are products of International Business Machines Corporation, located in Armonk, N.Y.

Although the depicted representation shows a computer, other embodiments of the present invention may be implemented in other types of data processing systems, such as a network computer. Computer 300 also preferably includes a graphical user interface (GUI) that may be implemented by means of systems software residing in computer readable media in operation within computer 300.

With reference now to FIG. 4, a block diagram of a data processing system is shown in which the present invention may be implemented. Data processing system 400 is an example of a computer, such as computer 300 in FIG. 3, in which code or instructions implementing the processes of the present invention may be located. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards.

In the depicted example, local area network (LAN) adapter 410, small computer system interface SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system such as Windows 2000, which is available from Microsoft Corporation. An object oriented programming system such as Java may run in conjunction with the operating system and provides calls to the operating system from Java programs or applications executing on data processing system 400. "Java" is a trademark of Sun Microsystems, Inc. Instructions for the operating system, the object-oriented programming system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4. Also, the processes of the present invention may be applied to a multiprocessor data processing system.

For example, data processing system 400, if optionally configured as a network computer, may not include SCSI host bus adapter 412, hard disk drive 426, tape drive 428, and CD-ROM 430. In that case, the computer, to be properly called a client computer, includes some type of network communication interface, such as LAN adapter 410, modem 422, or the like. As another example, data processing system 400 may be a stand-alone system configured to be bootable without relying on some type of network communication interface, whether or not data processing system 400 comprises some type of network communication interface. As a further example, data processing system 400 may be a personal digital assistant (PDA), which is configured with ROM and/or flash ROM to provide non-volatile memory for storing operating system files and/or user-generated data.

The depicted example in FIG. 4 and above-described examples are not meant to imply architectural limitations. For example, data processing system 400 also may be a notebook computer or hand held computer in addition to taking the form of a PDA. Data processing system 400 also may be a kiosk or a Web appliance.

The processes of the present invention are performed by processor 402 using computer implemented instructions, which may be located in a memory such as, for example, main memory 404, memory 424, or in one or more peripheral devices 426–430.

With reference now to FIG. 5A, a set of tables holding the design information for an example trace task state machine is illustrated in accordance with a preferred embodiment of the present invention. States table 510 defines the states that the trace task state machine may take. As seen in states table 510, the trace task finite state machine (FSM) may take states of "new," "starting," "running," "paused," "stopping," "stopped," and "error." The states are associated with identifiers S1–S7, respectively.

Actions table 520 defines the actions that the trace task FSM may take. Actions are operations that are performed internally or to some external mechanism. As seen in table 520, there are four actions, labeled "Start Embedded Task", "Stop Embedded Task", "Pause Trace Subsystem", and "Resume Trace Subsystem". These actions are associated with identifiers A1–A4, respectively.

Next, inputs observed table 530 defines the inputs that affect state transitions. The first input is "Embedded Task State Variable" associated with the identifier "TSV," that gets the state of a task (a specialized thread of software) that will be embedded in the trace task. This input is a state variable that may take the values of "new," "starting," "running," "stopping," "stopped," and "error."

The second input is "Embedded Command State Variable" associated with the identifier "CSV," that gets the value of a command from within the trace task. This input may take the values of "no-op", "start," "stop," "pause," and "resume."

Triggers table 570 includes two triggers. Triggers are the events which are received by the state machine. There are two triggers, labeled T1 and T2. When either trigger occurs, the state machine evaluates its inputs, computes its conditions, and determines the next state and any corresponding actions and event outputs.

Event outputs table 540 includes one output. This output is the "StateChangedEvent" which is sent to other objects when the trace task state machine changes state.

Conditions table 560 shows the logical conditions that are examined by different entries in the state table 550. The logical conditions are always Boolean in value (true or false). They are always formed from the examination of the values of some or all of the inputs 530 of the state machine. For example, the condition identified as C1 is true when two conditions are true: the value of the input identified as CSV has the value "no-op", and the value of the input identified as TSV has the value "new". As another example, the conditions identified as C5, C7, or C11 depend only on the value of one of the inputs, identified as TSV.

With reference now to FIG. 5B, state transitions table 550 defines state transitions, conditions that that cause the state transitions, actions that are taken in response to state transitions, and events that are generated when the state transitions complete. In each cell of the state transitions table, there are entries all three design components: condition, action, and event. For example, the trace task FSM may transition from a "new" state S1 to a "starting" state S2 only when condition C2 is true. When the trace task FSM transitions from "new" to "starting," action "A1" is taken, and event E1 is generated.

As another example in the state transitions table, the trace task FSM may transition from a "running" state S3 to a "paused" state S4 only when condition C10 is true. The condition C10 corresponds to receiving the "pause" command. The trace task FSM would then perform the action A3 to pause the internal trace subsystem, and it would generate a state changed event E1.

Some cells in the state table 550 have the value 'X'. This notation means that there is no legal transition defined for that cell. For example, if the trace task FSM is in the "starting" state S2, it cannot dispatch directly to the "paused" state S4.

Some cells in the state table 550 have more than one set of conditions, action, and events. For example, if the trace task FSM is in the "running" state S3, condition C3 or condition C8 may be in place. Note that for either of these conditions, independent actions and independent events may be generated, depending on which condition was evaluated to be true. Note also that for the implementation described in state table 550, the notation "--" means that no action or event is defined.

With reference now to FIG. 5C, it is well known in the art of state machines that an alternative representation to a state transition table is a graph of state transitions. FIG. 5C provides state graph 560. The state graph represents all of the-transitions defined in the state table 550. The absence of an edge in the graph between two nodes is equivalent to the notation of an "X" in the state table. For example, there is not an edge that directly connects S1 with S4. With either representation, the presentation of conditions, actions, and events fully defines the design information for the dynamic behavior of the state machine.

For each valid state transition, the conditions, actions, and events for that state transition are entered into table 550 and into the equivalent graph 560. However, regardless of the application, converting this set of tables into a program that operates as a state machine is no easy task. Furthermore, once a software state machine is created, it may be difficult to make changes and it may be difficult for one software state machine to interact with another software state machine.

In accordance with a preferred embodiment of the present invention, a programming framework for designing and implementing software state machines is provided. A state machine initializer may be created that defines the states, inputs, conditions, actions, triggers, events, and state transitions for the software state machines. A set of user interfaces, such as graphical user interfaces, may also be provided for creating initializers.

Examples of screens of display of state machine initializer windows are shown in FIGS. 6A–6D in accordance with a preferred embodiment of the present invention. Particularly, with respect to FIG. 6A, the screen comprises window 600, including a title bar 602, which may display the name of the application program. Title bar 602 also includes a control box 604, which produces a drop-down menu (not shown) when selected with the mouse, and "minimize" 606, "maximize" or "restore" 608, and "close" 610 buttons. The "minimize" and "maximize" or "restore" buttons 606 and 608 determine the manner in which the program window is displayed. In this example, the "close" button 610 produces an "exit" command when selected. The drop-down menu produced by selecting control box 604 includes commands corresponding to "minimize," "maximize" or "restore," and "close" buttons, as well as "move" and "resize" commands.

State machine initializer window 600 also includes a menu bar 612. Menus to be selected from menu bar 612 may include "File," "Edit," "View," "Insert," "Format," "Tools," "Window," and "Help." However, menu bar 612 may include fewer or more menus, as understood by a person of ordinary skill in the art.

The state machine initializer window display area includes a display area in which entered states 622 are displayed. The states may be edited in this display area. The display area may also include an "add new state" button 624. When this button is selected, a new state dialog may be presented.

Figure 6A:
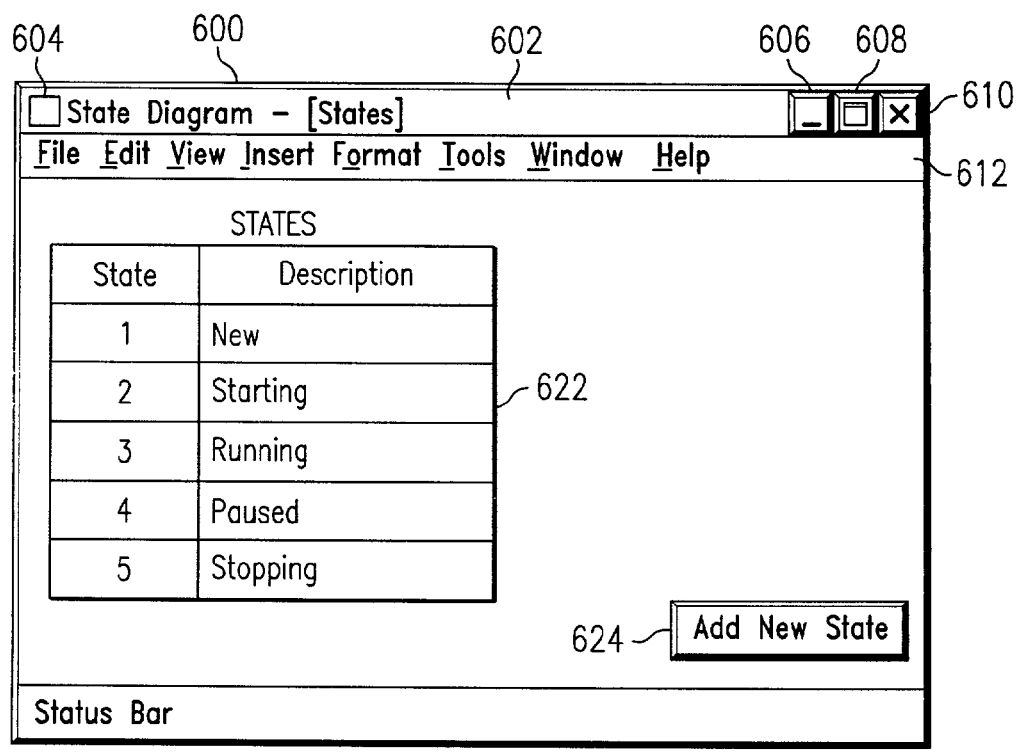
FIGS. 6A–6D are examples of screens of display of state machine initializer windows in accordance with a preferred embodiment of the present invention.
Figure 6B:
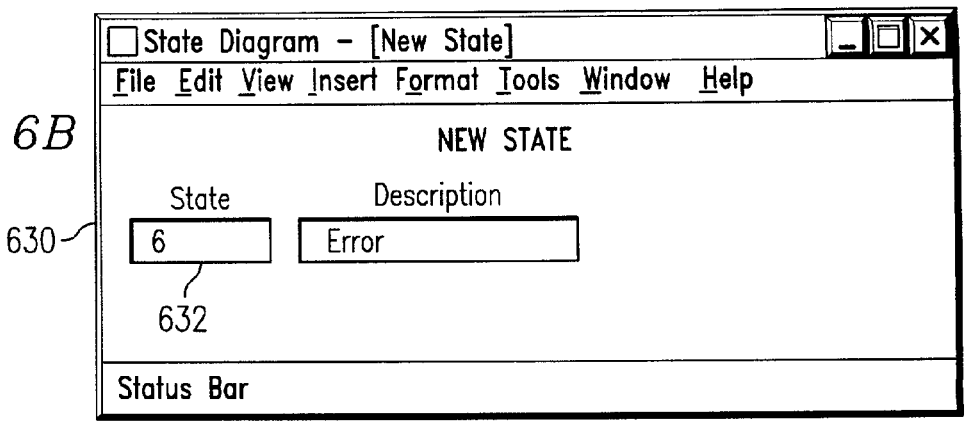

Turning to FIG. 6B, an example of a new state dialog window is shown in accordance with a preferred embodiment of the present invention. New state dialog window 630 includes a display area in which data entry fields 632 are presented for entering the new state information.

FIGS. 6A and 6B show an example of a graphical user interface for entering states for the trace task example shown in FIGS. 5A, 5B, and 5C. However, the illustrated user interface may also be used for other applications. Furthermore, other user interfaces may be used, such as a command line interface. Still further, similar graphical user interfaces may be used for entering actions, inputs observed, triggers, conditions, and events. There may also be graphical interfaces for entering the state table itself or for working with the state table graphically.

Figure 6C:
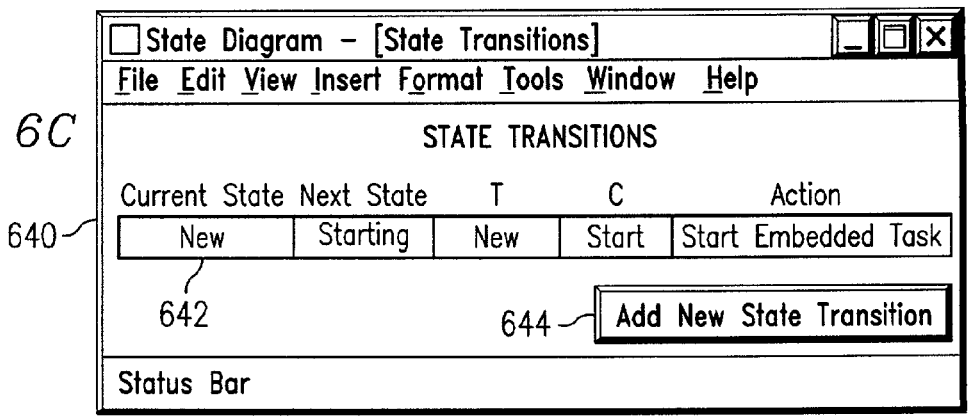

With reference now to FIG. 6C, state transition window 640, including a display area in which entered state transitions 642 are displayed. The state transitions may be edited in this display area. The display area may also include an "add new state transition" button 644. When this button is selected, a new state transition dialog may be presented.

Figure 6D:
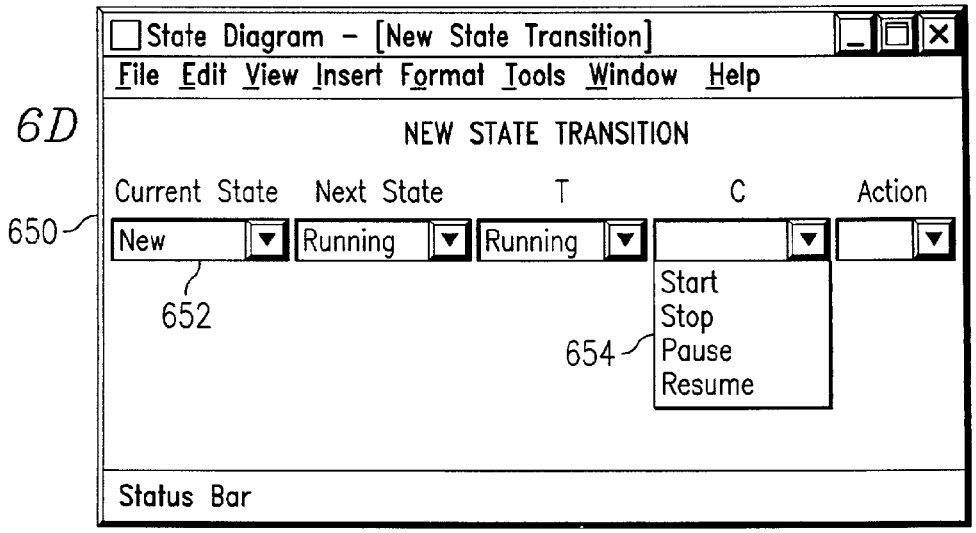

Turning to FIG. 6D, an example of a new state transition dialog window is shown in accordance with a preferred embodiment of the present invention. New state transition dialog window 650 includes a display area in which data entry fields 652 are presented for entering the new state transition information.

Each data entry field may include a drop-down window for entering the information. For example, drop-down window 654 may be used to select a value for the command (C) condition. Values may be presented from data that was previously collected using a graphical user interface similar to that shown in FIGS. 6A and 6B.

Once the data is collected by user interfaces, such as those shown in FIGS. 6A–6D, a specific state machine initializer object may be created. This object may be used by a finite state machine object to build the specific software state machine. Thus, the same FSM object may be used with different initializers to build different state machines. For example, an instance of the FSM object may be used with a trace task initializer to create a trace task FSM and an instance of the same FSM object may be used with a dictionary initializer to create a dictionary FSM.

The present invention may be implemented in a Java environment. At the center of a Java runtime environment is the Java virtual machine (JVM), which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

Figure 7:
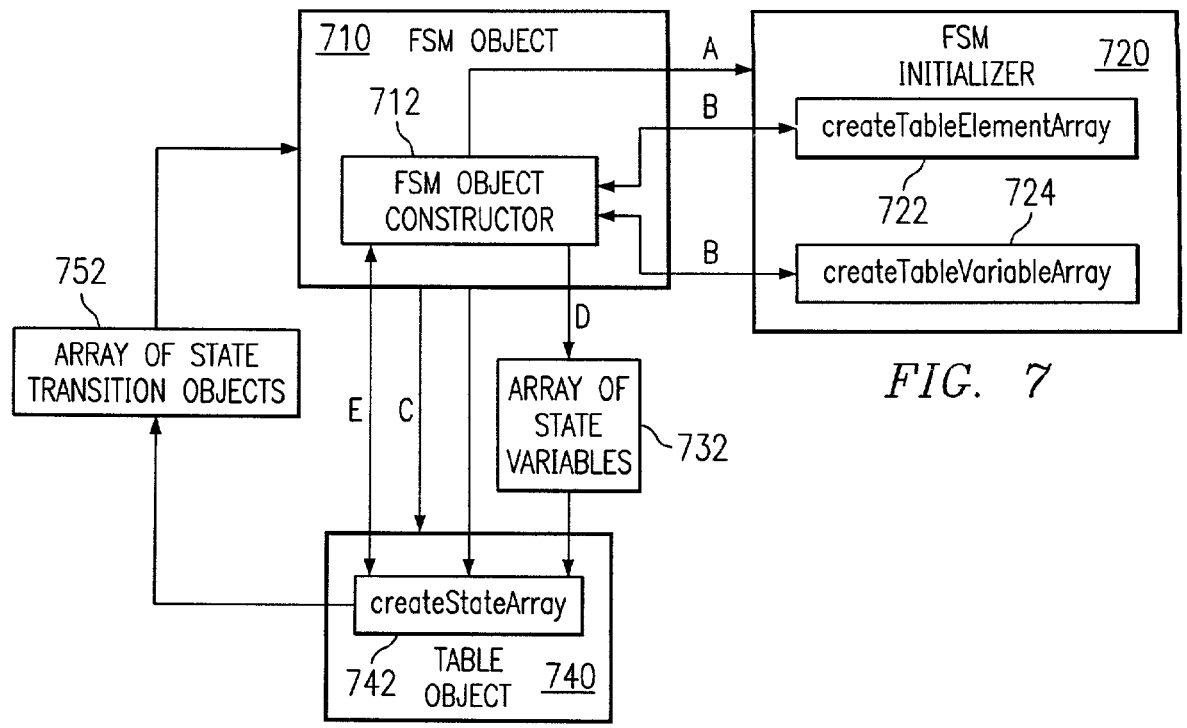
FIG. 7 is a block diagram illustrating the operation of software components to build a state machine in accordance with a preferred embodiment of the present invention.

With reference to FIG. 7, a block diagram illustrating the operation of software components to build a state machine is shown in accordance with a preferred embodiment of the present invention. When a thread or application desiring a FSM is run, FSM object 710 is created with a reference to an FSM initializer. The FSM object includes FSM object constructor 712. The FSM object constructor creates an instance of the FSM initializer 720 (step A).

The FSM initializer is a helper object. The FSM initializer includes methods "createTableElementArray" 722 and "createTableVariableArray" 724. FSM object constructor 712 calls these two methods (step B) and uses the results to create table object 740 (step C). The table object is also a helper object. The FSM object constructor also looks at the list of input variable names defined in the results from method 724 and builds array of state variables 732 which supply those inputs (step D). The instance of the FSM initializer may then be destroyed.

Table object 740 includes method "createStateArray" 742 that takes FSM object 710 and the array of state variables 732 as inputs. The FSM object constructor calls method 742 (step E) to create array of state transition objects 752, which is returned to the FSM object. Thereafter, having received the array of state transition objects, table object 740 may be destroyed and FSM object 710 is ready to run.

Figure 8A:
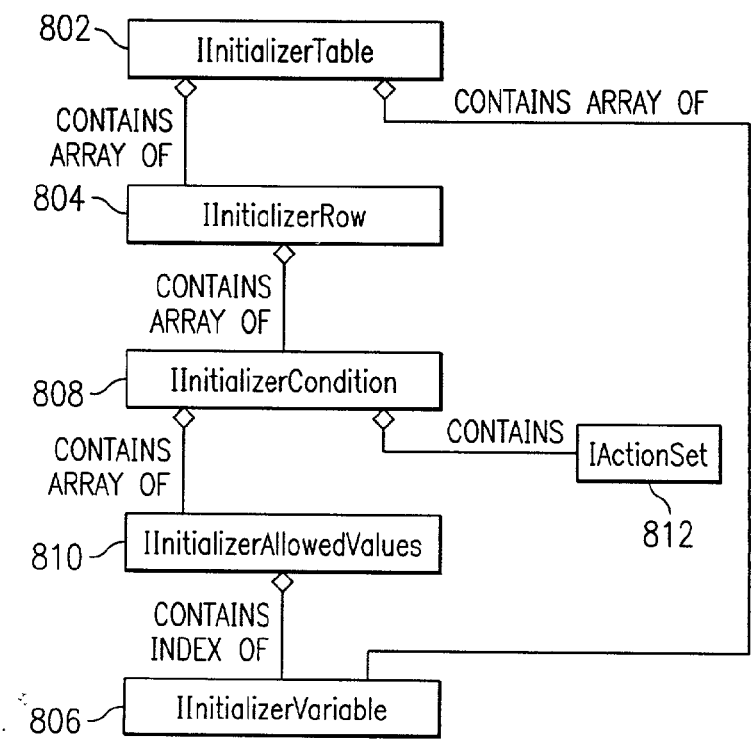
FIGS. 8A and 8B depict a set of interfaces for defining the programming framework in accordance with a preferred embodiment of the present invention.
Figure 8B:
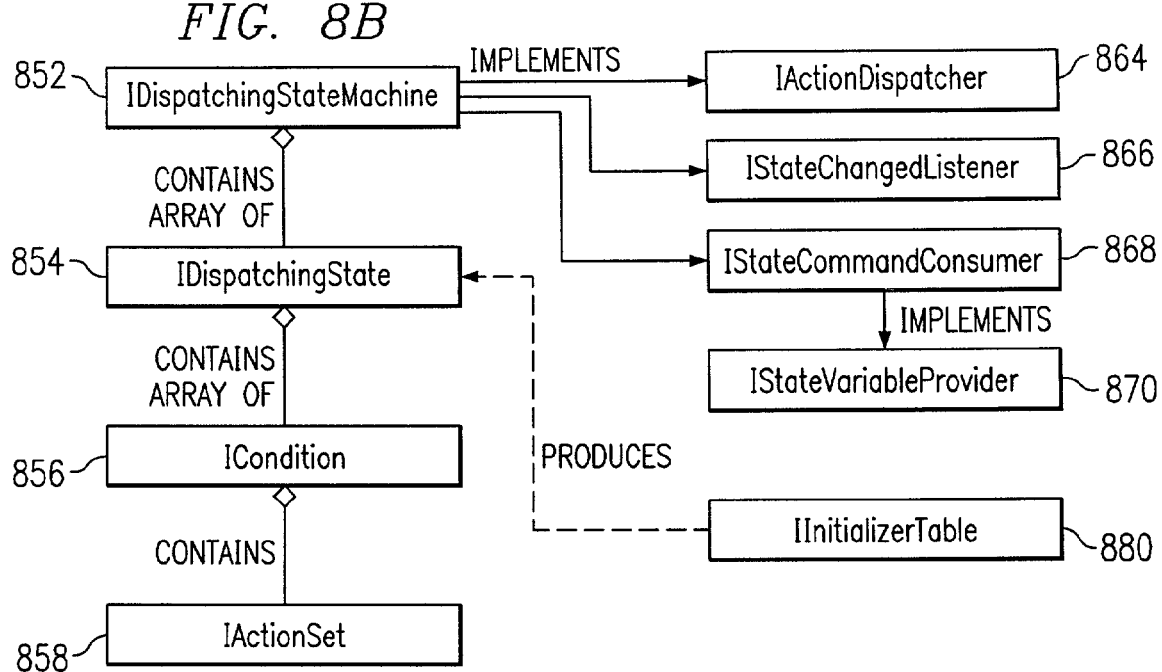

Turning now to FIGS. 8A and 8B, a set of interfaces for defining the programming framework is shown in accordance with a preferred embodiment of the present invention. An interface is a Java class that defines the structure of another Java class. For example, an interface defines the methods that a class may have.

In particular, FIG. 8A depicts a set of interfaces for a state machine initializer class. Any object implementing the IInitializerTable interface 802 must contain an array of IInitializerRow interfaces 804 and an array of IInitializerVariable interfaces 806. The IInitializerTable interface corresponds to the FSM Initializer 720 of FIG. 7. The IInitializerTable interface defines the structure for a state machine initializer object class. The IInitializerRow interface defines the structure for a row in an initializer object. The array of IInitializerRow objects correspond to the output of the "createTableElementArray" method 722. The IInitializerVariable interface defines the structure for a variable in an initializer object.

Each object implementing the IInitializerRow interface 804 contains an array of IInitializerCondition interfaces 808. The IInitializerCondition interface defines the structure for a condition. Each interface 808 contains an array of IInitializerAllowedValues interfaces 810 and an array of IActionSet interfaces 812. Interface 810 defines the allowed values for inputs and indexes the IInitializerVariable interface. Interface 812 defines the structure for actions in a state machine initializer.

FIG. 8B depicts a set of interfaces for a state machine object class. IDispatchingStateMachine interface 852 defines the structure of a state machine object class. Interface 852 implements IActionDispatcher interface 864, IStateChangedListener interface 866, and IStateCommandConsumer interface 868. Further, interface 868 implements IStateVariableProvider interface 870.

The IDispatchingStateMachine interface also contains an array of IDispatchingState interfaces 854. Interface 854 contains an array of ICondition interfaces 856 and Each ICondition interface contains an IActionSet interface 858. Also, IInitializerTable interface 880 produces interface 854.

When designing the logical operation of a state machine, the designer uses the user interfaces depicted in FIGS. 6A–6D to enter the design information. The tool providing the user interfaces stores the data in objects that obey the interface contract of the interfaces defined in FIG. 8A. The implementation of the objects holding the design data is provided by the tool supplier, but the interface meets the requirements and behaviors defined in this invention.

When designing the software implementation of a state machine, a second programmer uses standard Java software development tools to create a set of state machine objects that implement the runtime interfaces defined in FIG. 8B. The state machine consists of one or more objects, which in aggregate obey the interface relationships described in FIG. 8B.

As described in FIG. 7, an FSM object 710 meeting the interfaces of FIG. 8B, in particular interface IDispatchingStateMachine 852, will be created by a thread or application. The constructor of the FSM object 710 will use the initializer object 720 that meets the interfaces of FIG. 8A, in particular the IInitializerTable interface 802. Because the objects involved meet the interfaces, the bridge between design time specification and runtime execution is crossed easily.

Figure 9:
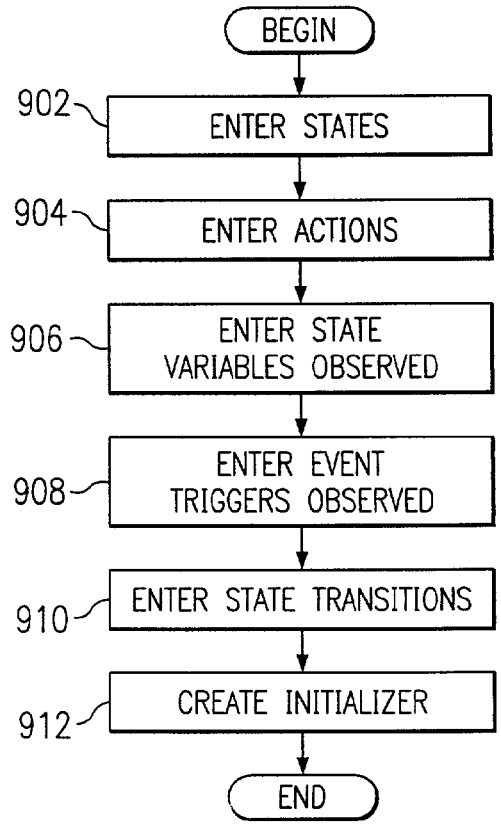
FIG. 9 is a flowchart illustrating the creation of a state machine initializer in accordance with a preferred embodiment of the present invention.

With reference to FIG. 9, a flowchart illustrating the creation of a state machine initializer is shown in accordance with a preferred embodiment of the present invention. The process begins, prompts a user to enter states (902), and prompts the user to enter actions (step 904). Then, the process prompts the user to enter state variables observed (step 906), prompts the user to enter event triggers observed (step 908), and prompts the user to enter state transition information (step 910). Thereafter, the process creates the FSM initializer (step 912) and ends. More sophisticated state machine design tools may allow iteration of this loop, or may allow the tasks to be completed in parallel.

Turning now to FIG. 10, a flowchart illustrating the binding of a state machine at runtime to the design information from the initializer is depicted in accordance with a preferred embodiment of the present invention. The process begins and creates a new FSM object (step 1002). The process then runs the FSM object constructor (step 1004) and the FSM object constructor creates a new instance of the FSM initializer (step 1006) and calls the createTableElementArray method and the createTableVariableArray method in the FSM initializer (step 1008).

Next, the FSM object constructor creates a new instance of a table object (step 1010) and creates an array of state variables from the results of the createTableVariableArray method (step 1012). The FSM object constructor calls the createStateArray method in the table object (step 1014). The createStateArray method creates an array of state transition objects and returns the array to the FSM object (step 1016). Thereafter, the FSM is ready to run and the process ends.

Thus, the present invention solves the disadvantages of the prior art by providing a framework for creating state machine initializers and for creating software state machines at runtime. A state machine initializer may be created using a graphical user interface. All the information for creating a state machine is provided in the state machine initializer without having to code every condition, state transition, and action. Furthermore, a general FSM object may be used with different state machine initializers to run different state machines.

A set of interfaces are provided to define the framework. Thus, state machine initializers and state machine implementations may be easily used together. For example, since the FSM object implements an interface, the FSM object includes a method that returns the state of the state machine. Therefore, a programmer may create one FSM that uses the initializer produced by another FSM tool as a condition without knowing the details of the programming of the other FSM.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the depicted embodiment is directed towards a programming framework in a Java environment, the processes of the present invention may be applied to other programming languages and environments. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for creating a software state machine, comprising:
    providing a state machine object in a runtime environment on a computer hardware platform, wherein the state machine object includes an object constructor method; and
    providing an initializer object in the runtime environment on the computer hardware platform, wherein the initializer object defines states, actions, and conditions for a software state machine and wherein the object constructor method is configured to create an instance of the initializer object,
    wherein the state machine object is configured to use the initializer object to create a table object, wherein the initializer object includes a table element array creation method and wherein the state machine object is configured to call the table element array creation method to create the table object using the results of the table element array creation method,
    wherein the state machine object is configured to create an array of state variables, wherein the initializer object includes a table variable array creation method and wherein the state machine object is configured to call the table variable array creation method to create the array of state variables using the results of the table variable array creation method,
    wherein the table object is configured to create an array of state transition objects based on the array of state variables and return the array of state transition objects to the state machine object, and
    wherein the state machine object is configured to execute the software state machine using the array of state transition objects.

2. The method of claim 1, wherein at least one of the state machine object and the initializer object implements an interface.

3. The method of claim 1, wherein the state machine object includes a state method that is configured to return a current state of the software state machine.

4. A method for creating software state machines, comprising:
    providing a state machine object in a runtime environment on a computer hardware platform;
    receiving, using a set of graphical user interfaces in the runtime environment on the computer hardware platform, entry of a plurality of states, one or more actions, one or more inputs, one or more conditions, one or more events, one or more triggers, and a plurality of state transitions for a software state machine;

creating an initializer object in the runtime environment on the computer hardware platform, wherein the initializer object define the plurality of state, the one or more actions, the one or more inputs, ths one or more conditions, the one or more events, the one or more triggers, and the plurality of state transition for the software state machine;

configuring the state machine object in, the runtime environment on the computer hardware platform to use the initializer object to create an array of state transition objects based on the plurality of state transitions, wherein each state transition object in the array of state transition objects references at least one of the one or more conditions that causes a given state transition in the software state machine, and wherein each condition is a Boolean expression formed from at least one of the one or more inputs; and responsive to occurrence of a trigger, evaluating the one or more inputs, computing the one or more conditions, and determining a next state based on the array of state transition objects, wherein a first state transition object in the array of state transition objects defines an action to take responsive to a given state transition, and wherein a second state transition object in the array of state transition objects defines an event to be generated responsive to a given state transition.

5. An apparatus for creating a software state machine, comprising:

a processor; and a memory having stored therein a state machine object and an initializer object, wherein the state machine object includes an object constructor method, wherein the initializer object defines states, actions, and conditions for a state machine, wherein the object constructor method is configured to create an instance of the initializer object, wherein the state machine object is configured to use the initializer object to create a table object, wherein the initializer object includes a table element array creation method and wherein the state machine object is configured to call the table element array creation method to create the table object using the results of the table element array creation method, wherein the state machine abject is configured to create an array of state variables, wherein the initializer object includes a table variable array creation method and wherein the state machine object is configured to call the table variable array creation method to create the array of state variables using the results of the variable array creation method, wherein the table object is configured to create an may of state transition objects based on the array of state variables and return the may of state transition objects to the state machine object, and wherein the state machine object is configured to execute the software state machine using the array of state transition objects.

6. The apparatus of claim 5, wherein at least one of the state machine object and the initializer object implements an interface.

7. The apparatus of claim 5, wherein the state machine object includes a state method tat is configured to return a current state of the software state machine.

8. A computer program product, in a tangible computer readable medium, for creating a software state machine, comprising:

instructions for providing a state machine object, wherein the state machine object includes an object constructor method; and instructions for providing an initializer object, wherein the initializer object defines states, actions, and conditions for a software state machine, wherein the object constructor method is configured to create an instance of the initializer object, wherein the state machine object is configured to use the initializer object to create a table object, wherein the initializer object includes a table element array creation method and wherein the state machine object is configured to call the table element array creation method to create the table object using the results of the table element array creation method, wherein the table object is configured to create and array of state variables, wherein the initializer object includes a table variable array creation method and wherein the state machine object is configured to call the table variable array creation method to create the array of state variables using the results of the variable array creation method, wherein the table object is configured to create an array of state transition objects based on the array of state variables and return the array of state transition objects to the state machine object, wherein the state machine object is configured to receive the array of state transition objects and execute the software state machine using the array of state transition objects.

9. A computer program product, in a tangible computer readable medium, for creating software state machines, comprising:

instructions for providing a state machine object;

instructions for receiving, using a set of graphical user interfaces, entry of a plurality of states, one or more actions, one or more inputs, one or more conditions, one or more events, one or more triggers, and a plurality of states transitions for a software state machine;

instructions for creating an initializer object, wherein the initializer object defines the plurality of states, the one or more actions, the one or more inputs, the one or more conditions, the one or more events, the one or more triggers, and the plurality of state transitions for the software state machine;

configuring the state machine object to use the initializer object to create an array of state transition object based on the plurality of state transitions, wherein each state transition object in the array of state transition objects references at least one of the one or more conditions that causes a given state transition in the software state machine, and wherein each condition is a Boolean expression formed from at least one of the one or more inputs; and instructions, responsive to occurrence of a trigger, for evaluating the one or more inputs, computing the one or more conditions, and determining a next state based on the array of state transition objects, wherein a first state transition object in the array of state transition objects defines an action to take responsive to a given state transition, and wherein a second state transition object in the array of state transition objects defines an event to be generated responsive to a given state transition.

* * * * *

UNITED STATES PATENT AND TRADEMARK OFFICE
CERTIFICATE OF CORRECTION

PATENT NO. : 6,993,706 B2
APPLICATION NO. : 10/047801
DATED : January 31, 2006
INVENTOR(S) : Cook It is certified that error appears in the above-identified patent and that said Letters Patent is hereby corrected as shown below:

Col. 11, line 7: after "object" delete "define the plurality of state" and insert --defines the pluality of states--.

Col. 11, line 8: after "inputs," delete "ths" and insert --the--.

Col. 11, line 10: after "state" delete "transition" and insert --transitions--.

Col. 11, line 12: after "in" delete " , ".

Col. 11, line 49: after "machine" delete "abject" and insert --object--.

Col. 11, line 56: after "create an" delete "may" and insert --array--.

Col. 11, line 58: after "return the" delete "may" and insert --array--.

Col. 11, line 67: after "method" delete "tat" and insert --that--.

Col. 12, line 51: after "transition" delete "object" and insert --objects--.

Signed and Sealed this

Seventeenth Day of October, 2006

JON W. DUDAS
*Director of the United States Patent and Trademark Office*